US010579840B2

(12) United States Patent
Bhargava et al.

(10) Patent No.: US 10,579,840 B2
(45) Date of Patent: *Mar. 3, 2020

(54) SECURING INTERNET OF THINGS (IOT) RF (RADIO FREQUENCY) LOCATION TAGS USING SOURCE ADDRESSES TO LOCATE STATIONS ON A WI-FI NETWORK

(71) Applicant: Fortinet, Inc., Sunnyvale, CA (US)

(72) Inventors: Saurabh Bhargava, San Jose, CA (US); Anil Kaushik, Marathalli Bangalore (IN); Ajay Malik, Sunnyvale, CA (US)

(73) Assignee: Fortinet, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/105,886

(22) Filed: Aug. 20, 2018

(65) Prior Publication Data
US 2019/0108372 A1  Apr. 11, 2019

Related U.S. Application Data

(63) Continuation of application No. 15/620,779, filed on Jun. 12, 2017, now Pat. No. 10,055,616, which is a (Continued)

(51) Int. Cl.
*G06K 7/10* (2006.01)
*H04W 4/029* (2018.01)
(Continued)

(52) U.S. Cl.
CPC .......... *G06K 7/10257* (2013.01); *G01S 5/00* (2013.01); *G01S 5/0215* (2013.01);
(Continued)

(58) Field of Classification Search
None
See application file for complete search history.

(56) References Cited

U.S. PATENT DOCUMENTS 9,679,171 B2 *   6/2017   Bhargava .............. G01S 5/0215
10,055,616 B2 *  8/2018   Bhargava .............. G01S 5/0215
(Continued)

*Primary Examiner* — Daniell L Negron
(74) *Attorney, Agent, or Firm* — Law Office of Dorian Cartwright; Dorian Cartwright

(57) ABSTRACT

RF tags using source addresses to locate stations on a Wi-Fi network are secured. An RF location server receives a pseudo source address of an RF (radio frequency) tag from a station. The station obtains the pseudo source address while being within radio range of the RF tag and the station receiving a beacon frame from the RF tag. A source address for the RF tag is looked-up utilizing the pseudo source address, and a specific location for the RF tag is looked-up utilizing the source address. Some embodiments store the locations in association with the pseudo address. Either way, the specific location of the station is identified based on the source address of the RF tag. An action is determined in response to at least the specific location of the station. Information related to the action is sent to the station for output to a user of the station. For example, a location-based offer or service can be provided in real-time with a consumer's presence to relevant products or services.

15 Claims, 5 Drawing Sheets

Related U.S. Application Data continuation of application No. 14/975,977, filed on Dec. 21, 2015, now Pat. No. 9,679,171.

(60) Provisional application No. 62/094,936, filed on Dec. 19, 2014.

(51) Int. Cl.
| | |
|---|---|
| *G01S 5/00* | (2006.01) |
| *G01S 5/02* | (2010.01) |
| *H04K 3/00* | (2006.01) |
| *H04W 12/08* | (2009.01) |
| *H04W 4/80* | (2018.01) |
| *H04W 64/00* | (2009.01) |
| *H04W 12/12* | (2009.01) |

(52) U.S. Cl.
CPC ........... *G06K 7/10366* (2013.01); *H04K 3/90* (2013.01); *H04W 4/029* (2018.02); *H04W 4/80* (2018.02); *H04W 12/08* (2013.01); *H04W 12/12* (2013.01); *H04W 64/00* (2013.01)

(56) References Cited

U.S. PATENT DOCUMENTS

| | | |
|---|---|---|
| 2009/0315704 A1 | 12/2009 | Rosing |
| 2011/0178863 A1 | 7/2011 | Daigle |
| 2016/0112838 A1 | 4/2016 | Kaushik |

\* cited by examiner

SECURING INTERNET OF THINGS (IOT) RF (RADIO FREQUENCY) LOCATION TAGS USING SOURCE ADDRESSES TO LOCATE STATIONS ON A WI-FI NETWORK

CROSS-REFERENCE TO RELATED APPLICATIONS

This application claims priority as a continuation of U.S. patent application Ser. No. 15/620,779, filed Jun. 12, 2017, which is a continuation of U.S. patent application Ser. No. 14/975,977, filed Dec. 21, 2015, now issued U.S. Pat. No. 9,679,171, no which claims the benefit of priority under 35 U.S.C. 119(e) to U.S. Application No. 62/094,936, filed Dec. 19, 2014, entitled SECURED RF (RADIO FREQUENCY) TAGS FOR LOCATING USERS, by Saurabh Bhargava, et al., the contents of which hereby incorporated by reference in its entirety.

FIELD OF THE INVENTION

The invention relates generally to computer networking, and more specifically, to securing RF location tags that use source addresses to locate users.

BACKGROUND

Today RF location tags provide location services, in particular for mobile users. For example, a shopper walking down aisles of a store can receive location tags from a transmitter and, responsive to the shopper location, receive product coupons, product information, and more, for nearby products. When the shopper moves to a different location in the store and receives different location tags from a different transmitter, appropriate product coupons and product information can be sent base on the new location.

The location tags include a source address (e.g., a MAC, or media access control, address) which indicates which device sent out location tags. A user device can cross-reference source addresses with a server that stores locations of transmitters. The transmitter location is used as the presumed user location for the purpose of selecting data to send to a shopper. The source address field is unencrypted even if a corresponding payload is encrypted.

One vulnerability of the current RF location tags with unencrypted source addresses is spoofing by other hardware RF location devices. In more detail, other transmitters can transmit location tags using the same known source address.

Another vulnerability of the current RF location tags with unencrypted source addresses is snooping on a user device by other RF location software. For example, a first store mobile application on the user device can be snooped on by a second store mobile application executing in the background. Once locations of the first store transmitters are discovered and catalogued, the second store can then serve competing product coupons. When the user is near televisions in a first store, the second store mobile application can send coupons for its own televisions. Both hardware and software vulnerabilities erode reliability and security of RF location systems.

Therefore, what is needed is a technique that provides locations for users with secured location tags that cannot be snooped, emulated, or intercepted by unintended hardware and software processes.

SUMMARY

These shortcomings are addressed by the present disclosure of computer-implemented methods, computer program products, and systems for securing RF tags using source addresses to locate stations on a Wi-Fi network.

In one embodiment, an RF location server receives a plurality of pseudo source address of an RF (radio frequency) tag from a station. The station obtains the pseudo source address while being within radio range of the RF tag and the station receiving a beacon frame from the RF tag. A source address for the RF tag is looked-up utilizing the pseudo source address, and a specific location for the RF tag is looked-up utilizing the source address. Some embodiments store the locations in association with the pseudo address. Either way, the specific location of the station is identified based on the source address of the RF tag.

In some embodiments, an action is determined in response to at least the specific location of the station. Information related to the action is sent to the station for output to a user of the station. For example, a location-based offer or service can be provided in real-time with a consumer's presence to relevant products or services. Responsive to expiration of a pre-determined period of time, the pseudo source address can be updated to a new pseudo source address. Beacons transmitted by the station are able to be received by any Wi-Fi device within radio range of the station without any explicit security protocol. A system can include a memory with a first module, a second module, a third module, a fourth module, a fifth module and a sixth module.

Advantageously, identification of RF tags are protected from spoofing and other comprises, thereby enhancing reliability and security of location-based services.

BRIEF DESCRIPTION OF THE DRAWINGS

In the following drawings, like reference numbers are used to refer to like elements. Although the following figures depict various examples of the invention, the invention is not limited to the examples depicted in the figures.

DETAILED DESCRIPTION

The present invention provides methods, (non-transitory) computer program products, and systems for locating users in a secure manner over Wi-Fi networks from source addresses of the RF tags. At a high-level, actual source addresses sent by RF devices, and used to determine locations of stations, are replaced by alternative information such as pseudo random MAC addresses, a single fixed address for all RF devices along with unique identifiers encrypted in a payload, or strategically rotated SRC MAC addresses. One of ordinary skill in the art will recognize that many other scenarios are possible, as discussed in more detail below.

Systems for Secure RF Location Tags (FIGS. 1-4)

Figure 1:
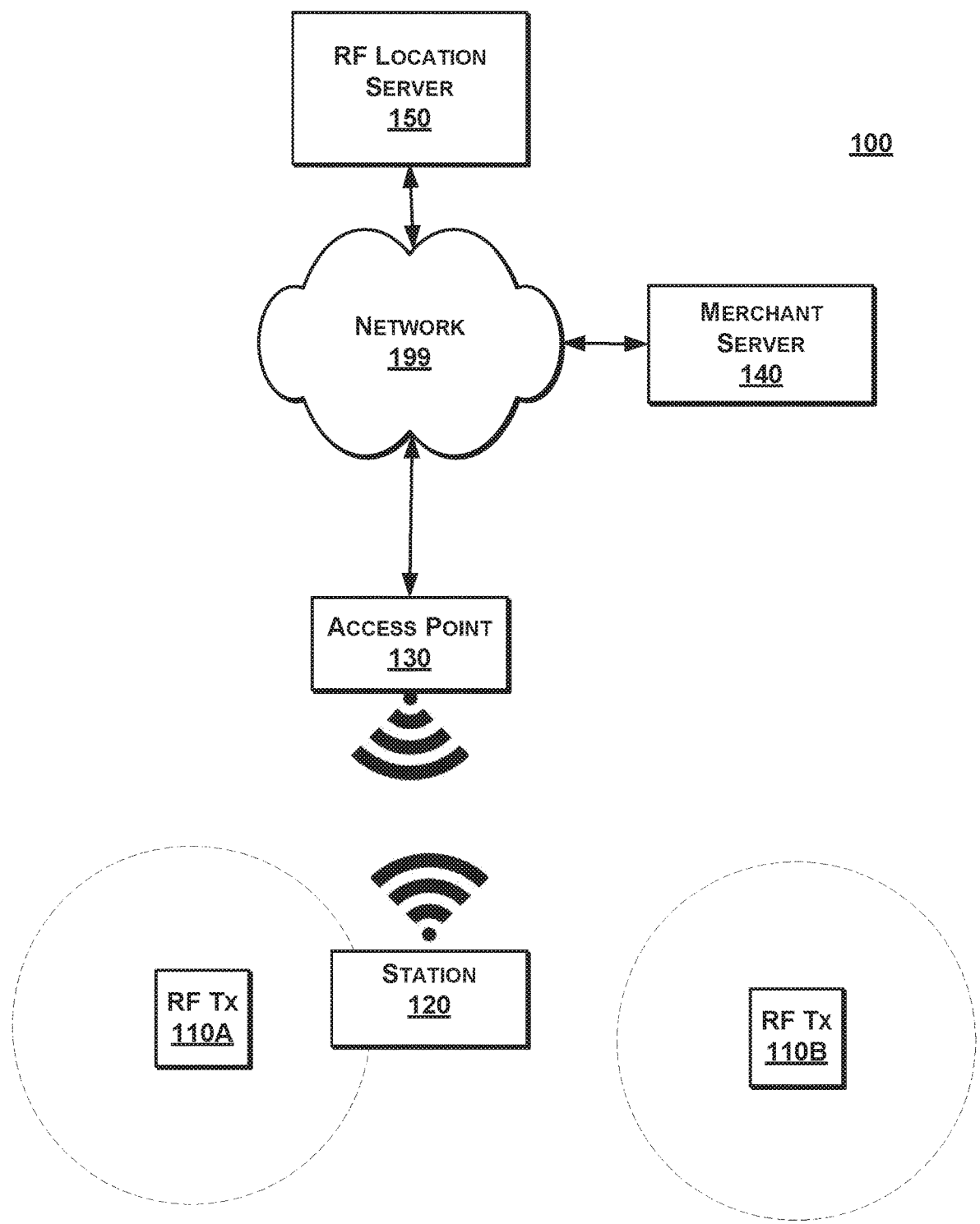
FIG. 1 is a high-level block diagram illustrating a system to secure RF tags using source addresses to locate stations on a Wi-Fi network, according to one embodiment.

FIG. 1 is a high-level block diagram illustrating a system 100 to secure RF tags using source addresses to locate stations on a Wi-Fi network, according to one embodiment. The system 100 includes RF Tx (transmitters) 110A,B, a station 120, an access point 130, merchant server 140, coupled to a network 199. The system 100 is merely an example of many possible configurations which could include more or access points, a controller, additional stations, routers, switches, firewalls, and the like. For instance, embodiments of the system 100 can be implemented in conjunction with a network security system, for example, the FortiGate Network Security platform by Fortinet of Sunnyvale, Calif. In some embodiments, a virtual port service running on the system 100 provides a uniquely-assigned and persistent BSSID (Basic Service Set Identifier) to realize location-based services that are customized for that station 110. In other embodiments, an SDN (Software-Defined Networking) controller uses OpenFlow rules to centralize how secure RF tags are handled on a data plane of the system 100. The network components can be implemented as hardware, software, or a combination of both.

The network 199 is utilized by mobile and non-mobile stations via access points. In more detail, the network 199 couples to each of the Wi-Fi RF location server 150, the merchant server 140 and the access point 130 for communication, preferably over a wired communication channel such as Ethernet. In turn, the station 120 can be wireless coupled in communication with the access points 130 (i.e., a Wi-Fi portion of the system 100). Wireless components preferably use communication protocols such as IEEE 802.11 n and IEEE 802.11 ac, in addition to other protocols such as other IEEE 802.11s, IEEE 802.3 (promulgated by the Institute of Electrical and Electronic Engineers), Bluetooth, 3G and 4G. The network 199 can serve, for example, a business enterprise, a hospital or system of hospital, school, building, a private network, or the like. The network 199 can provide access to a wide area network or the Internet in some embodiments. Alternatively, the network 199 can be distributed over the Internet, in other embodiments. A combination of wired and wireless devices can be connected, as well as only wireless devices or only wired devices. The network 199 can be, for example, the Internet, a cellular network, a larger enterprise network to which the network 199 is a smaller component of, or a combination of network types.

In one embodiment, an RF location server 150 determines a location of the station 120 by decrypting pseudo-source addresses submitted by the station 120 as it comes into contact with RF Txs 110A,B. When the system 100 is configured, RF Txs 110A,B are placed in locations for business reasons or otherwise, and those locations are recorded and submitted to the RF location server 150. At a high-level, actual source addresses sent by RF Txs 110A-B, and used to determine locations of stations, are replaced by alternative information such as pseudo random MAC addresses, a single fixed address for all RF devices along with unique identifiers encrypted in a payload, or strategically rotated SRC MAC addresses. The RF location server 150 can use many different internal processes for decrypting. For example, a look-up table of pseudo-addresses can be used to determine an actual address, and a corresponding location. In another example, a decrypting algorithm can be applied to the pseudo-address to reveal the actual address. In still another example, a synching algorithm can use a time stamp to determine the actual address. However it is determined, the actual address may be returned to the station 120 or the merchant server 140 for determining a location, or the location can be determined and sent by the RF location server 150 as well.

Figure 7:
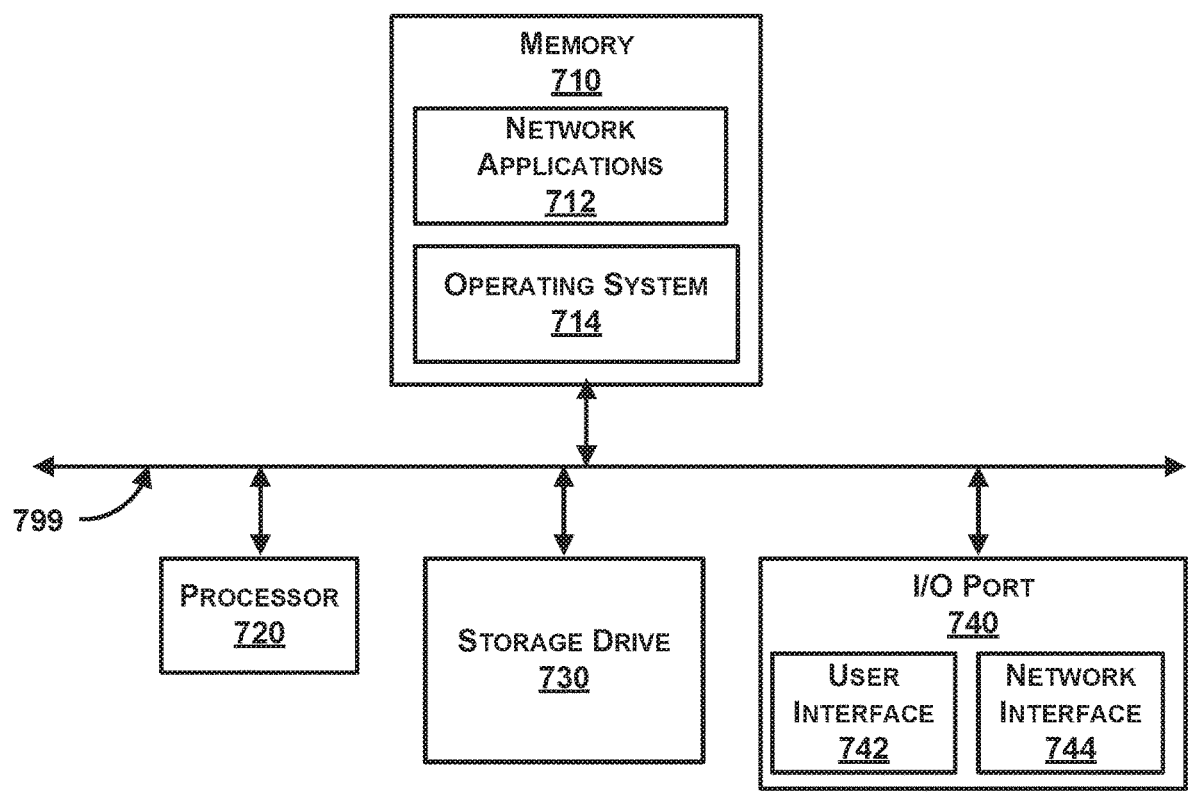
FIG. 7 is a block diagram illustrating an exemplary computing device, according to one embodiment.

The RF location server 150 can be, for example, a personal computer, a laptop computer, a tablet computer, a smart phone, a mobile computing device, a server, a cloud-based device, a virtual device, an Internet appliance, or any of the other computing devices described herein (see e.g., FIG. 7). The RF location server 150 of one embodiment is owned by a merchant and integrated with the merchant server 150. The RF location server 150 of another embodiment is owned by a third party to whom a merchant is a client having a user account. Other embodiments incorporate the functionality in to the access point 130, or even the station 120 itself. Embodiments of the RF location server 150 are detailed below in association with FIG. 2.

The merchant server 140 leverages location information of the station 120 for various purposes. In one instance, the merchant server 140 generates instant offers or coupons for a user of the station 120 in real-time that are relevant to a particular location. A shopper at a grocery store can be offered 10% off of a nearby product on the shelf. A person exiting a building can have their security clearance revoked. A tourist at a monument can receive facts and information about the monument. In some cases, the RF Txs 110A,B are owned and placed by the same entity in control of the merchant server 140. In other cases, a merchant can pay for location devices.

The merchant server 140 can be, for example, a personal computer, a laptop computer, a tablet computer, a smart phone, a mobile computing device, a server, a cloud-based device, a virtual device, an Internet appliance, or any of the other computing devices described herein (see e.g., FIG. 7). The merchant server 140 is set for the in more detail below with respect to FIG. 3.

The access point 130 provides access to the network 199 for communications back and forth with the station 120. Physically, the access point 130 includes one or more individual access points implemented in any of the computing devices discussed herein (e.g., see FIG. 7). The access point 130 can be an AP 110 or AP 433 (modified as discussed herein) by Meru Networks of Sunnyvale, Calif. A network administrator can strategically place the access point 130 for optimal coverage area over a locale. The access point 130 can, in turn, be connected to a wired hub, switch or router connected to the network 199 (or an external network). In one embodiment, access point functionality is incorporated into a switch or router. In another embodiment, the access point 120 is a virtual device.

The station 120 extracts source addresses from beacon frames of the RF Txs 110A,B when within RF radio range. Beacon frame are advertisements that are periodically sent out over Wi-Fi by the RF Txs 110A,B. The beacon frame can comprise various information, without limitation, but preferably includes fields for source address, destination address, data, and any other appropriate fields. The source address can be extracted without any type of explicit connection to the RF Txs 110A,B which in some cases have no capacity for full communications. In turn, the source addresses are sent to the RF location server 150 for decrypting.

The station 120 can receive offers or other information from the merchant server 140 responsive to decrypting the source address and determining the associate location. For example, the station 120 can comprise a display screen that starts playing a commercial video of a nearby product. In an alternative example, an audio chirp can indicate a text message with certain information. One example displays only a location. Some examples receive the location and initiate internal process at the station 120. A printer connected to the station 120 can receive a print out.

The station 120 can comprise, for example, a mobile station, a stationary station, a personal computer, a laptop computer, a tablet computer, a smart phone, a mobile computing device, a server, a cloud-based device, a virtual device, an Internet appliance, or any of the computing devices described herein (see e.g., FIG. 7). No special client is needed for this particular technique, however, a mobile app can be downloaded for location execution on the station 130. The stations 130A-C access, for example, a LAN (local area network) or external networks using an RF (radio frequency) antenna and network software complying with IEEE 802.11. Details about the station 130 are set forth in FIG. 4.

The RF Txs 110A,B can be strategically located by an entity such as a retail store, business, tourist attraction, school or hospital. As a consumer moves around a facility to new locations, location is tracked by nearby RF Txs through a smart telephone or other receiver carried by the consumer. For example, a store can place the RF Txs 110A near televisions displayed at the store and RF Txs 120B near mops. Each product has unique coupons presented to the consumer in real-time while proximate to the product. In some implementations, only one of RF Txs 110A,B is deployed, while RF Txs 110A,B are part of a much larger deployment, in another implementation.

The RF Txs 110A,B can comprise an device attachable to physical objects using an adhesive or screw, for example. A Wi-Fi transmitter with a battery and supporting circuitry is a baseline for different implementations. The Wi-Fi transmitter can also have receiver capabilities for programming or other communications, but is preferably minimized for low power consumption. The battery is preferably a slim profile or other small power source. Data such as source address is stored in memory cells. Some low priced versions of RF Txs 110A,B are disposed of when the battery runs out and replaced with a new transmitter. RF Txs 110A,B can also comprise computers, smart telephones or other more robust computerized devices.

Figure 2:
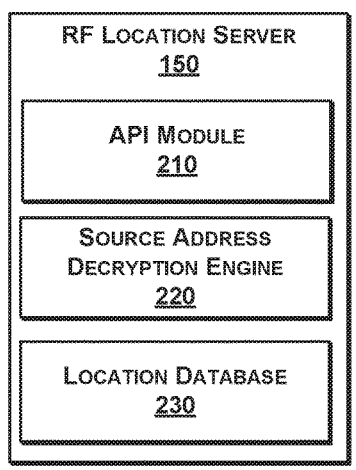
FIG. 2 is a more detailed block diagram illustrating a RF location server of the system of FIG. 1, according to one embodiment.

FIG. 2 is a more detailed block diagram illustrating the RF location server 150, according to an embodiment. The RF location server 150 includes an API (Application Programming Interface) module 210, a source address decryption engine 220, and a location database 230.

In one embodiment, the API module 210 provides an interface for the merchant server 140, the station 130, and any administrators logging on to a user account. The source address decryption engine 220 can look-up locations using pseudo-source addresses received through the API module 210 in the location database 230. The location database 230 is preconfigured and can be updated as pseudo source addresses and locations are updated. In one embodiment, the location database 230 represents two separate databases, one storing pseudo source addresses in association with actual source addresses, and another storing actual source addresses in association with locations. The second database can also store source addresses that are not subject to security measures of pseudo source addresses described herein.

Figure 3:
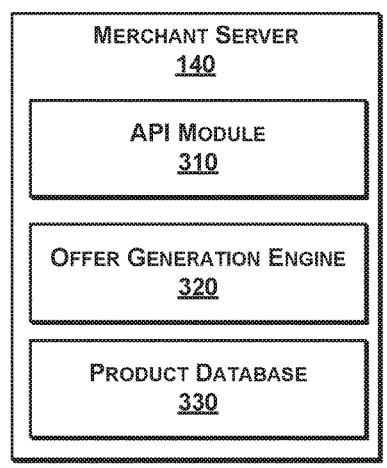
FIG. 3 is a more detailed block diagram illustrating a merchant server of the system of FIG. 1, according to one embodiment.

FIG. 3 is a more detailed block diagram illustrating the merchant server 140, according to an embodiment. The merchant server 140 comprises an API module 310, an offer generation engine 320, and a product database 330.

In some embodiments, the API module 310 provides an interface for the RF location server 150, the station 130, and any administrators logging on to a user account. The offer generation engine 320 generically represents coupon offers, multimedia, services, and any other relevant information or action that can be provided from the product database (or other type of database) responsive to detecting a user at a specific location. The product database 330 of an embodiment stores locations in association with actions.

Figure 4:
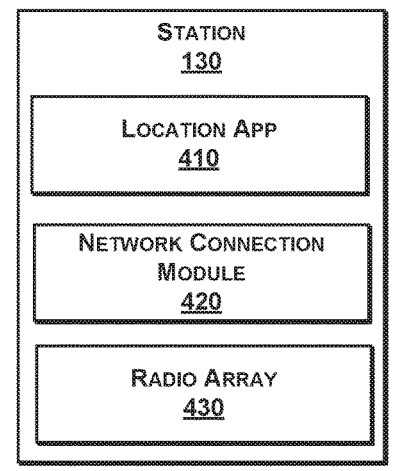
FIG. 4 is a more detailed block diagram illustrating a station of the system of FIG. 1, according to one embodiment.

FIG. 4 is a more detailed block diagram illustrating a station 130, according to one embodiment. The station 130 includes a location app 410, a network connection module 420, and a radio array 430.

The location app 410 of some embodiments is downloaded to a smart telephone or other device over a data network and installed locally. When executed, the location app 410 runs as a daemon that senses beacon frames from nearby RF tags. In one case, the RF tag beacon is distinguished from other types of beacons such as access point beacon frames. The network connection module 420 handles the protocol stacks necessary to process beacon frames for extracting source addresses. The network connection module 420 also handles the higher level protocol aspects of connecting to an access point for network access. The radio array 430 includes at least a Wi-Fi radio. Some embodiments include more than one Wi-Fi radio and/or other types of radios such as a Bluetooth radio or an Ethernet input.

The components of FIGS. 2-4 can be implemented in hardware, software, or a combination of both.

Figure 5:
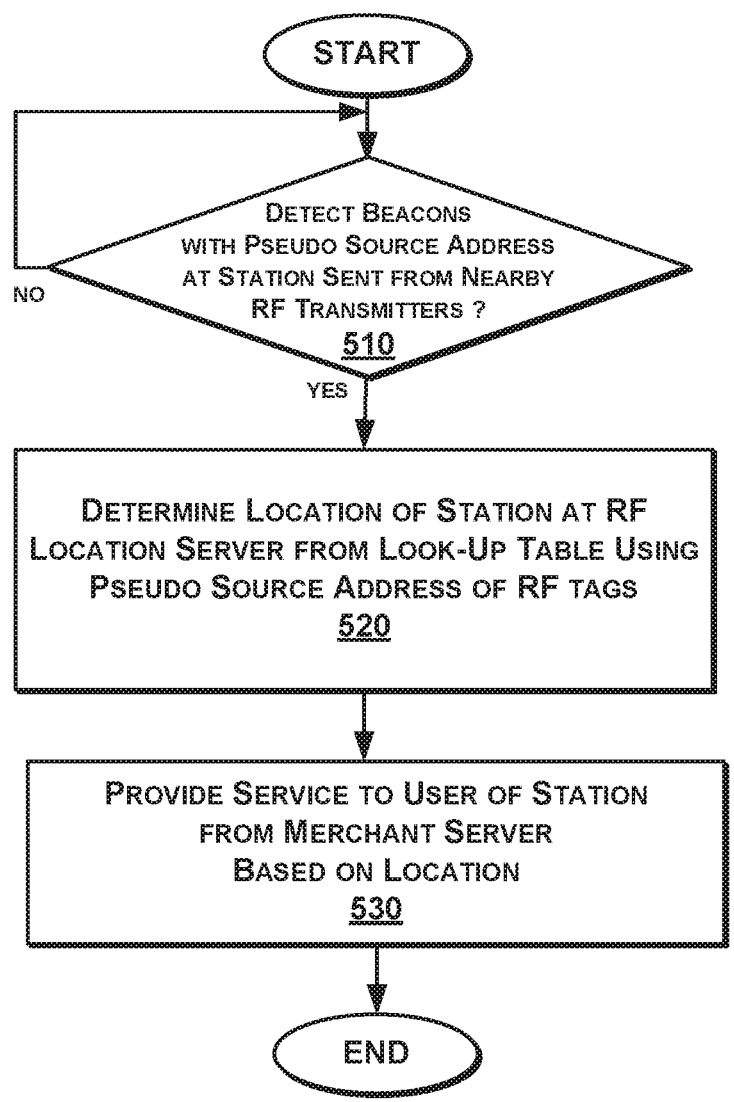
FIG. 5 is a high-level flow diagram illustrating a method for securing RF tags using source addresses to locate stations on a Wi-Fi network, according to one embodiment.
Figure 6:
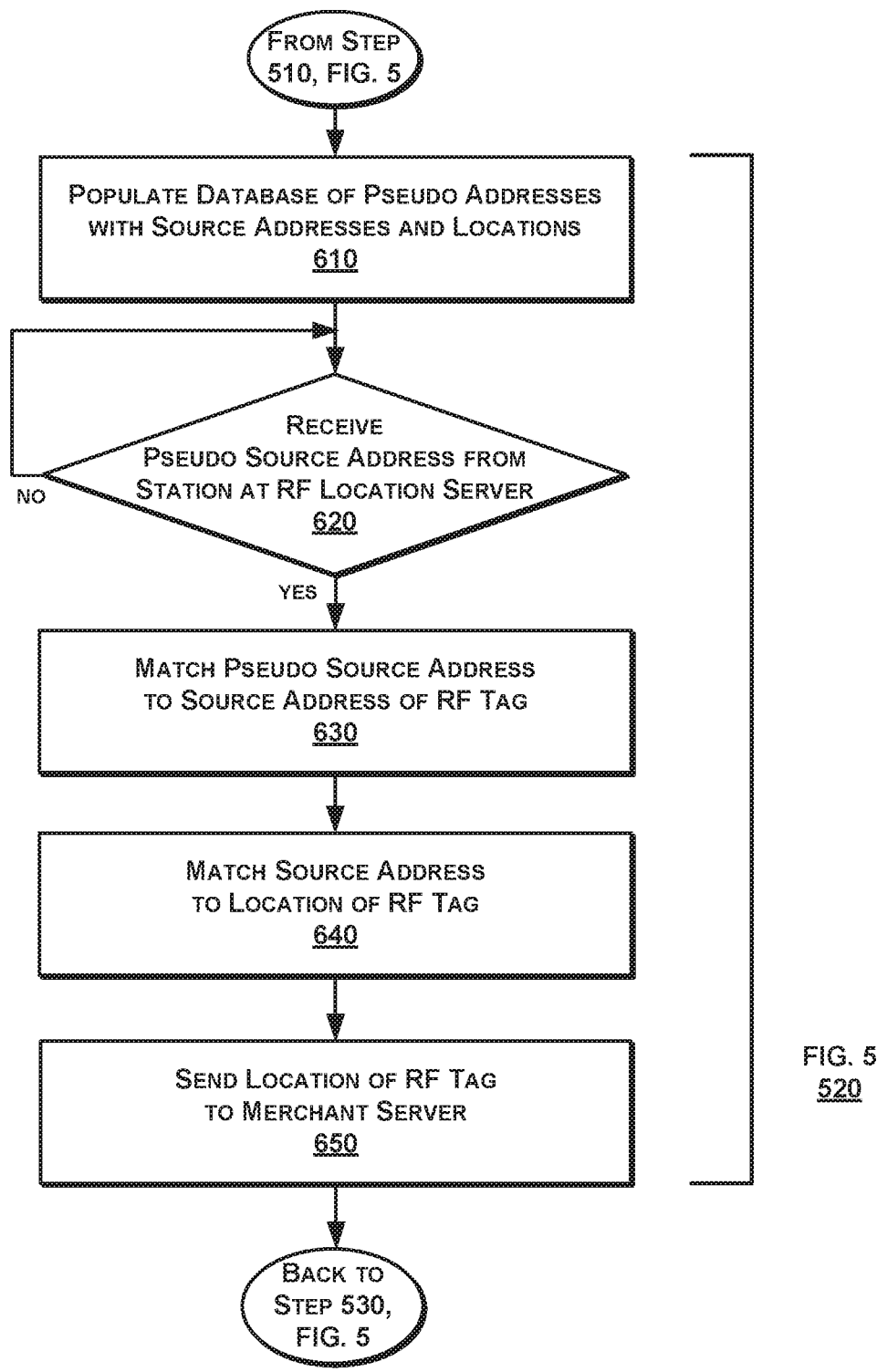
FIG. 6 is a more detailed block diagram illustrating the step for selecting an access point for handing-off a station, from the method of FIG. 5, according to one embodiment.

Methods for Secure RF Tags (FIG. 5-6)

FIG. 5 is a high-level flow diagram illustrating a method 500 for securing RF tags using source addresses to locate stations on a Wi-Fi network, according to one embodiment. One of ordinary skill in the art will recognize that the method 500 is non-limiting as other embodiments can have more or less steps and can be performed in a different order. The method 500 can be implemented in the system 100 of FIG. 1 or in other components.

Stations detect beacons with pseudo source addresses sent from nearby RF Txs (step 510). Responsive to the detections, determining locations of stations at an RF location server from a look-up table using pseudo-source addresses of RF Txs (step 520), as detailed below in association with FIG. 6. Services are then provided to uses or the stations from the merchant server, based on the locations (step 530).

FIG. 6 is a more detailed block diagram illustrating the step 520 for selecting an access point for handing-off a station, from the method of FIG. 5, according to one embodiment.

A database of pseudo addresses is populated with source addresses and locations (step 610). Pseudo source addresses are received from stations (step 620). The pseudo-addresses can be provided in real-time with a user presence near a particular RF location tag. In response, the pseudo addresses are matched to source addresses in the database (step 630). Using the same database, or a separate resource, the source addresses are matched to locations of the RF tags. The corresponding locations for RF tags are sent to the merchant server for further processing (step 650).

Generic Computing Device (FIG. 7)

FIG. 7 is a block diagram illustrating an exemplary computing device 700 for use in the system 100 of FIG. 1, according to one embodiment. The computing device 700 is an exemplary device that is implementable for each of the components of the system 100, the RF location server 150, the merchant server 140, the access point 130, or the station 120. The computing device 700 can be a mobile computing device, a laptop device, a smartphone, a tablet device, a phablet device, a video game console, a personal computing device, a stationary computing device, a server blade, an Internet appliance, a virtual computing device, a distributed computing device, a cloud-based computing device, or any appropriate processor-driven device.

The computing device 700, of the present embodiment, includes a memory 710, a processor 720, a storage drive 730, and an I/O port 740. Each of the components is coupled for electronic communication via a bus 799. Communication can be digital and/or analog, and use any suitable protocol.

The memory 710 further comprises network applications 712 and an operating system 714. The network applications 712 can include the modules of the RF location server 150, the merchant server 140, the access point 130, or the station 120, as illustrated in FIGS. 1-4. Other network applications 712 can include a web browser, a mobile application, an application that uses networking, a remote application executing locally, a network protocol application, a network management application, a network routing application, or the like.

The operating system 714 can be one of the Microsoft Windows® family of operating systems (e.g., Windows 75, 78, Me, Windows NT, Windows 2000, Windows XP, Windows XP x64 Edition, Windows Vista, Windows CE, Windows Mobile, Windows 7 or Windows 8), Linux, HP-UX, UNIX, Sun OS, Solaris, Mac OS X, Alpha OS, AIX, IRIX32, or IRIX64. Other operating systems may be used. Microsoft Windows is a trademark of Microsoft Corporation.

The processor 720 can be a network processor (e.g., optimized for IEEE 802.11), a general purpose processor, an application-specific integrated circuit (ASIC), a field programmable gate array (FPGA), a reduced instruction set controller (RISC) processor, an integrated circuit, or the like. Qualcomm Atheros, Broadcom Corporation, and Marvell Semiconductors manufacture processors that are optimized for IEEE 802.11 devices. The processor 720 can be single core, multiple core, or include more than one processing elements. The processor 720 can be disposed on silicon or any other suitable material. The processor 720 can receive and execute instructions and data stored in the memory 710 or the storage drive 730

The storage drive 730 can be any non-volatile type of storage such as a magnetic disc, EEPROM, Flash, or the like. The storage drive 730 stores code and data for applications.

The I/O port 740 further comprises a user interface 742 and a network interface 744. The user interface 742 can output to a display device and receive input from, for example, a keyboard. The network interface 744 (e.g. RF antennae) connects to a medium such as Ethernet or Wi-Fi for data input and output.

Many of the functionalities described herein can be implemented with computer software, computer hardware, or a combination.

Computer software products (e.g., non-transitory computer products storing source code) may be written in any of various suitable programming languages, such as C, C++, C #, Oracle® Java, JavaScript, PHP, Python, Perl, Ruby, AJAX, and Adobe® Flash®. The computer software product may be an independent application with data input and data display modules. Alternatively, the computer software products may be classes that are instantiated as distributed objects. The computer software products may also be component software such as Java Beans (from Sun Microsystems) or Enterprise Java Beans (EJB from Sun Microsystems).

Furthermore, the computer that is running the previously mentioned computer software may be connected to a network and may interface to other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, and 802.11ac, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

We claim:

1. A computer-implemented method in an access point executed at least partially in computer hardware for securing RF (radio frequency) tags using source addresses to locate stations on a Wi-Fi network, the method comprising the steps of:

receiving a pseudo source address of an RF (radio frequency) tag from a station, the station being within radio range of the RF tag and the station receiving a beacon frame from the RF tag, wherein the beacon frame comprises the pseudo source address in a source address field;

looking-up a source address for the RF tag utilizing the pseudo source address at an RF location server that is remote from the mobile device, the pseudo source address stored with a plurality of pseudo source addresses each matched to at least one source address;

looking-up a specific location for the RF tag utilizing the source address at the RF location server, the source address stored with a plurality of source addresses each matched to a location;

identifying the specific location of the station based on the source address of the RF tag;

determining an offer for a nearby product at a merchant server based on at least the specific and current location of the station; and sending the offer to the station for output to a user of the station while at the specific location by the nearby product.

2. The method of claim 1, wherein the pseudo source address comprises a MAC address that is not inherently associated with the RF tag.

3. The method of claim 1, wherein the source address comprises a MAC address that is inherently associated with the RF tag.

4. The method of claim 1, wherein the RF tag periodically transmits a beacon frame comprising a source address field containing the pseudo source address.

5. The method of claim 1, wherein the source address comprises a MAC (media access control) address associated with the RF tag.

6. The method of claim 1, further comprising:

receiving a new source address for a new RF tag from an authorized user;

generating a new pseudo source address corresponding to the new source address;

storing the new pseudo source address in association with the new source address among the plurality of pseudo source addresses; and sending the new pseudo source address to the station to the authorized user, wherein the new pseudo source address is programmed into the new RF tag.

7. The method of claim 6, further comprising:

receiving a new location for a new RF tag from an authorized user; and storing the new location in association with the new source address of the new RF tag.

8. The method of claim 1, further comprising:

receiving a new location for the RF tag from an authorized user; and updating the location to the new location.

9. The method of claim 1, further comprising:

detecting a security compromise associated with the pseudo source address; and generating a new pseudo source address for the RF tag.

10. The method of claim 1, further comprising:

responsive to expiration of a pre-determined period of time, updating the pseudo source address to a new pseudo source address, wherein the RF tag updates the source address to the new pseudo source address without a direct communication between the RF tag and the RF location server, wherein the RF tag generates beacon frames using the new pseudo source address.

11. The method of claim 1, further comprising:

receiving a new action based on the specific location of the station; and updating the action in association with the specific location of the RF tag.

12. The method of claim 1, wherein beacons transmitted by the station are able to be received by any Wi-Fi device within radio range of the station without any explicit security protocol.

13. The method of claim 1, wherein the RF tag and the station are in wireless communication under an IEEE 802.11 protocol.

14. A non-transitory computer-readable medium storing source code in an access point that, when executed by a processor, performs a method for securing RF (radio frequency) tags using source addresses to locate stations on a Wi-Fi network, the method comprising the steps of:

receiving a pseudo source address of an RF (radio frequency) tag from a station, the station being within radio range of the RF tag and the station receiving a beacon frame from the RF tag, wherein the beacon frame comprises the pseudo source address in a source address field;

looking-up a source address for the RF tag utilizing the pseudo source address at an RF location server that is remote from the mobile device, the pseudo source address stored with a plurality of pseudo source addresses each matched to at least one source address;

looking-up a specific location for the RF tag utilizing the source address at the RF location server, the source address stored with a plurality of source addresses each matched to a location;

identifying the specific location of the station based on the source address of the RF tag;

determining an offer for a nearby product at a merchant server based on at least the specific and current location of the station; and sending the offer to the station for output to a user of the station while at the specific location by the nearby product.

15. An access point in communication with an RF (radio frequency) location server to secure RF (radio frequency) tags using source addresses locate stations on a Wi-Fi network, the access point comprising:

a processor; and a memory, storing:

a first module to receive a pseudo source address of an RF (radio frequency) tag from a station, the station being within radio range of the RF tag and the station receiving a beacon from the RF tag, wherein the beacon frame comprises the pseudo source address in a source address field;

a second module to look-up a source address for the RF tag utilizing the pseudo source address at an RF location server that is remote from the mobile device, the pseudo source address stored with a plurality of pseudo source addresses each matched to at least one source address;

a third module to look-up a location for the RF tag utilizing the source address at the RF location server, the source address stored with a plurality of source addresses each matched to a location;

a fourth module to identify a specific location of the station based on the source address of the RF tag;

a fifth module to determine an offer for a nearby product at a merchant server based on at least the specific and current location of the station; and a sixth module to send the offer to the station for output to a user of the station while at the specific location by the nearby product.

* * * * *